June 8, 1971   W. LEHMANN   3,583,929
HIGH-SPEED PHOSPHORS AND METHOD TO PREPARE SAME
Original Filed Oct. 3, 1967
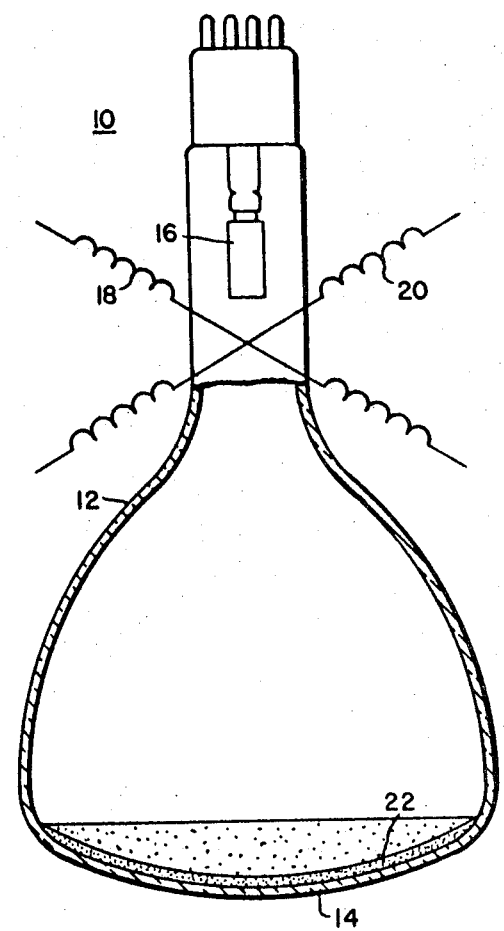

3,583,929
HIGH SPEED PHOSPHORS AND METHOD TO PREPARE SAME

Willi Lehmann, Murrysville, Pa., assignor to Westinghouse Electric Corporation, Pittsburgh, Pa.
Original application Oct. 3, 1967, Ser. No. 672,494, now Patent No. 3,534,210, dated Oct. 13, 1970. Divided and this application Mar. 25, 1970, Ser. No. 22,564
Int. Cl. C09k 1/12, 1/16
U.S. Cl. 252—301.6S        7 Claims

ABSTRACT OF THE DISCLOSURE

High-speed phosphor is cadmium sulfide doped with aluminum, gallium or indium. The cadmium sulfide matrix can be modified to include a small amount of zinc, selenium, or both. Each atom of the dopant contributes one free electron to the conductvity of the phosphor and due to the elimination of traps, the phosphor has fast decay characteristics which are estimated to be in the order of $10^{-10}$ second. In the preferred mode of preparation, the phosphor is fired in hydrogen to cause the fired material, when cooled, to display substantially a maximum possible value of electrical conductivity. Among the special application for such phosphor are cathode-ray devices.

CROSS-REFERENCE TO RELATED APPLICATION

This application is a division of application Ser. No. 672,494, filed Oct. 3, 1967, now Pat. No. 3,534,210.

In co-pending application Ser. No. 672,493, filed Oct. 3, 1967, now Pat. No. 3,534,211, by the present applicant is disclosed a high-speed phosphor and method, as well as a cathode-ray device, wherein the phosphor is zinc oxide doped with aluminum, gallium, or indium. While the matrix material of this zinc oxide phosphor is different from the present phosphor, the method of preparation is quite similar.

BACKGROUND OF THE INVENTION

This invention broadly relates to high-speed phosphors and, more particularly, to cathode-ray devices which incorporate, a particular high-speed phosphor, the high-speed phosphor composition, and the method for preparing same.

Phosphors which have a very rapid decay time are known as high-speed phosphors. Such materials have use in flying-spot scanners, control phosphors in color television tubes, scintillation counters, and experimental or manufacturing control phosphors such as might be used to determine a transit time and spread for photomultiplier tubes, to name a few of the applications.

Phosphors which have a relatively fast decay time are known in the art and include green-emitting zinc oxide which has a decay time of about $1 \times 10^{-6}$ second, yellow-green-emitting magnesium sulfide activated by antimony, which also has a decay time of about $1 \times 10^{-6}$ second, and various silicates and phosphates which contain cerium and emit in the near ultraviolet with a decay time between about $2 \times 10^{-8}$ second and $1 \times 10^{-7}$ second. It is desirable to have phosphors which have even faster decay times.

Cadmium sulfide is a known phosphor material and for this phosphor material, a so-called "edge-emission" normally is observed only at very low temperatures. In explanation of the term "edge-emission," this can be defined as a phosphor emission which occurs at a wavelength which is only slightly longer than the long wavelength "edge" of the phosphor absorption spectrum. In the case of the cadmium sulfide, this edge emission consists of a narrow emission band with a peak at approximately 515 to 520 nm.

In measuring a phosphor material for so-called "high-speed" characteristics, the phosphor decay time is the primary factor in determining the speed of the phosphor, since the speed with which the phosphor initially responds to excitation is at least as fast as the speed at which the emission decays after excitation, and usually the speed of initial response to excitation is faster than the decay. The phosphor decay time as measured herein is that period of time required for the phosphor brightness to decay from a maximum value to a value which is 37% of the maximum value.

As further background, the term dope or dopant as used herein refers to a donor impurity which constitutes a lattice defect that is able to supply at least one free electron into the conduction band of the phosphor matrix, or alternatively, any impurity that enhances the n-type conductivity of the matrix material.

SUMMARY OF THE INVENTION

It is the general object of the present invention to provide a phosphor material which has an extremely high speed.

It is another object to provide a method for preparing a phosphor material which has an extremely high speed.

The foregoing objects of the invention, and other objects which will become apparent as the description proceeds, are achieved by providing a phosphor composition having a matrix of cadmium sulfide, which may be modified by slight additions of zinc, or selenium, or both. The phosphor matrix is doped with predetermined amounts of aluminum, gallium, or indium. Due to the conditions of preparation, the electrical conductivity is substantially at a maximum possible value, because of the substantial elimination of all traps in the phosphor. There is also provided a method for preparing the phosphor.

Considering the method broadly, it is adaptable to making a high-speed phosphor from any material comprising an inorganic, n-type semiconductor matrix doped with a predetermined amount of selected inorganic metallic dopant compound. The dopant is incorporated into the matrix as a lattice defect and can contribute at least one free electron to the matrix conduction band. In making a high-speed phosphor from this material, there is first formed the n-type semiconductor matrix, and there is included with the matrix a small, predetermined amount of selected dopant. The formed matrix and dopant are then fired, either in a hydrogen atmosphere or in an atmosphere of the major metallic constituent of the matrix, at a sufficient temperature and for a sufficient time to cause the resulting fired material, when cooled, to display substantially that maximum value of electrical conductivity that is permitted by the amount of the dopant in the matrix. The temperature and time of firing should be so selected as not to exceed such conditions as will cause the matrix to appreciably decompose.

BRIEF DESCRIPTION OF THE DRAWING

For a better understanding of the invention, reference should be made to the accompanying drawing wherein the sole figure is a plan view, partly in section, of a cathode-ray device incorporating a phosphor screen which comprises the very high-speed phosphor of the present invention.

DESCRIPTION OF THE PREFERRED EMBODIMENTS

To prepare the cadmium sulfide phosphor of the present invention, a matrix material of cadmium sulfide, cadmium-zinc sulfide, cadmium sulfo-selenide, or cadmium-zinc sulfo-selenide is fired in an inert atmosphere at a temperature of from 700° C. to 1200° C. for a sufficient period of time to achieve a particle size as desired in the phosphor. As an example, the average particle size of the final phosphor is 5 to 10 microns. The raw materials which are fired should have such composition that the gram-atom ratio of cadmium to zinc in the mix is at least 15:1, and the gram-atom ratio of sulfur to selenium in the mix is at least 3:1. If aluminum is desired in the final phosphor, aluminum sulfide or aluminum compound which will form the sulfide on heating is also added, prior to prefiring, in such amounts that the gram-atom ratio of aluminum to Group II–B metal in the mix is from 0.0001 to 0.05.

If indium or gallium are to be used as dopants in the phosphor, they can be added to the sulfide or sulfo-selenide, either prior to the prefiring or after prefiring, and these dopant metals are added as sulfide or compound which will form sulfide on heating. The total Group III–A metal compound, which is added to the sulfide or sulfo-selenide, is such that the gram-atom ratio of such dopant metal to total cadmium plus zinc in the matrix is from 0.0001 to 0.05.

As a final step in the preparation, the first-fired material is again fired either in a hydrogen atmosphere or in an atmosphere of cadmium vapor at a temperature of from about 400° C. to about 600° C. for a sufficient period of time to cause the resulting fired material, after cooling, to display substantially a maximum possible value of electrical conductivity.

EXAMPLE I

As a first example, a solution of indium nitrate is prepared by dissolving 3.82 grams of $In(NO_3)_3 \cdot 3H_2O$ in 100 ml. water, which corresponds to an indium concentration of $10^{-4}$ gram atomic weight per ml. Ten ml. of this solution is added to 145 grams of luminescent grade cadmium sulfide powder, a uniform slurry is formed from this mixture, and the slurry is then dried. The dried powder is placed into a quartz container in an atmosphere of slowly flowing hydrogen sulfide, which constitutes an inert atmosphere with respect to the matrix, and is fired at approximately 800° C. for approximately one hour. After cooling, the material is gently ground and is then refired in slowly flowing hydrogen gas at a temperature of approximately 500° C. for approximately 30 minutes. After cooling, the phosphor is green emitting under ultraviolet or cathode-ray excitation. The phosphor has a speed of response, i.e., a decay time, which is so rapid that it could not be measured by available apparatus, which was limited to measuring a decay time of no less than about $5 \times 10^{-9}$ second. It is estimated that the decay time of the phosphor is in the order of about $10^{-10}$ second.

EXAMPLE II 0.52 gram of dry $In_2(SO_4)_3$ powder is admixed with 145 grams of dry cadmium sulfide powder (luminescent grade material) by ball milling. Thereafter, the raw mix is prefired and then fired in flowing hydrogen gas in the manner as described in Example I. The resulting phosphor is identical to that achieved under Example I. Corresponding aluminum or gallium compounds, or any mixtures of the dopant compounds, can be substituted for the indium compound in the foregoing examples.

EXAMPLE III

Pure cadmium sulfide is prefired, without any dopant addition, in hydrogen sulfide at a temperature of approximately 900° C. for approximately one hour. Indium is then added, either in solution as in Example I, or as a dry powder as in Example II, and the mixture is refired in hydrogen gas at approximately 600° C. for 30 minutes. The resulting phosphor is identical to that achieved under Example I.

EXAMPLE IV

Indium is added either in liquid solution or dry, as in Examples I and II, to powdered cadmium sulfide and the mixture prefired at approximately 900° C. for approximately one hour. The resulting material is gently ground, the raw mix placed in a quartz tube, and about 0.1 gram of cadmium metal per 100 grams of cadmium sulfide added to the tube. The tube is thereafter evacuated and sealed off. The entire tube is then fired at a temperature of approximately 600° C. for approximately 30 minutes, so that the actual firing atmosphere for the phosphor constitutes an atmosphere of cadmium vapor. After cooling, the phosphor is substantially identical to that reported under Example I.

EXAMPLE V

A thin film of pure cadmium sulfide, in the order of one micron thick, is deposited by evaporation upon a hard glass substrate. Phosphor which has been previously prepared, in accordance with Examples I–IV, is placed on the cadmium sulfide film and the composite is fired in hydrogen gas at approximately 400° C. for approximately 30 minutes. After cooling, the cadmium sulfide film, which lacks any appreciable structure, displays a light yellow body color and n-type conductivity. The luminescence is green under ultraviolet or cathode-ray excitation at room temperature and the decay characteristics are substantially the same as reported for the previous examples.

In the foregoing examples, some of the cadmium can be replaced by zinc, although the gram-atom ratio of cadmium to zinc in the phosphor should be at least 15:1. Also, some of the sulfur can be replaced by selenium, although the gram-atom ratio of sulfur to selenium in the phosphor should be at least 3:1. The aluminum, gallium and indium can be mixed in any proportions provided that the ratio of gram atoms of the Group III–A metal to gram atoms of Group II–B metal is from 0.0001 to 0.05. For this phosphor, the preferred dopant is indium present in the amount of about 0.001 gram atom per gram atom of total cadmium plus zinc in the phosphor matrix. The prefiring atmosphere can be inert, such as argon, or sulfurizing.

The final firing procedure in a hydrogen atmosphere, or in the atmosphere of cadmium vapor, at the temperature of from about 400° C. to about 600° C., should be conducted for a sufficient period of time to cause the resulting fired material to display substantially that maximum possible value of electrical conductivity as is permitted by the amount of dopant in the matrix. In explanation of this conductivity, the final firing under the specified conditions causes the total cadmium plus zinc in the matrix to exceed that amount which is required to form the stoichiometric sulfide, and apparently this serves to fill all traps in the matrix, thereby accounting for the extremely fast decay since the presence of traps is responsible for the phosphorescence or afterglow. As a result, substantially each atom of the dopant in the phosphor contributes one free electron to the electrical conductivity of the phosphor. This is best illustrated in accordance with the test reports in the following Table I.

TABLE I

Influence of various atmospheres on electrical powder resistance* and on color of photoluminescence at room temperature.

| Atmosphere during refiring at 500° C. | No impurity added | | 0.1% In added | |
| --- | --- | --- | --- | --- |
| | Ohms | Color | Ohms | Color |
| $H_2$ | $2 \times 10^7$ | Dead | 80 | Green. |
| $H_2S$ | $>10^8$ | ...do | $10^5$ | Red. |
| Ar | $>10^8$ | ...do | $5 \times 10^4$ | Do. |
| $N_2$ | $>10^8$ | ...do | $8 \times 10^4$ | Do. |
| $NH_3$ | $>10^8$ | ...do | $8 \times 10^4$ | Do. |
| He | $>10^8$ | ...do | $5 \times 10^4$ | Do. |

*Measured with 1.5 volts D.C. applied to a powder layer of 1 cm.² area and 1 mm. thickness pressed between two brass electrodes.

The foregoing measurements are of a qualitative nature since the measurement of electrical resistance of bulk powder is not very reliable. These tests clearly indicate, however, the vast difference in electrical conductivity which is obtained using the hydrogen firing atmosphere, in contrast with other atmospheres. The measured conductivity will also vary with the amount of dopant which is included within a specified range. To illustrate, the calculated value of conductivity for non-particulate (i.e., solid) cadmium sulfide doped with the minimum specified amount of 0.0001 gram atom per gram atom of cadmium is about 5 mhos and the calculated value of conductivity for the maximum dopant amount of 0.05 gram atom is about $2 \times 10^3$ mhos.

The cadmium sulfide matrix of the present phosphor and the zinc oxide matrix of the phosphor disclosed in the aforementioned copending application Ser. No. 672,493 each comprise an n-type semiconductor matrix. The matrix material is doped with a selected dopant which is incorporated into the matrix as a lattice defect and can contribute at least one free electron to the matrix conduction band. When the matrix and dopant are fired in the hydrogen atmosphere or in the atmosphere of the major metallic constituent of the matrix, under the conditions as specified, the resulting material, when cooled, will display substantially that maximum value of electrical conductivity as is permitted by the amount of dopant in the matrix. Of course the firing conditions should not be such as to cause appreciable decomposition of the matrix.

With specific reference to the form of the invention illustrated in the sole figure of the drawing, the numeral 10 illustrates a cathode-day device which is generally of conventional construction and comprises an evacuated envelope 12, including a face plate 14. An electron gun 16 is positioned within the neck portion of the envelope 12, and the device is provided with a conventional electron deflecting means, illustrated diagrammatically as deflecting coils 18 and 20. A phosphor screen 22 is positioned between the face plate 14 and the electron gun 16 and this phosphor screen comprises the high-speed phosphor of the present invention. It should be clear that the tube 10 as illustrated is only shown in diagrammatic form and that the present high-speed phosphor can be used equally well in a color television tube as a control phosphor, in which case the present prosphor would be used in conjunction with conventional color T.V. tube phosphors, shadow mask, plural guns, etc.

The present phosphor also has application in flying-spot scanners and scintillation counters, and because of the extremely fast decay time, there exist many other uses for this phosphor.

It will be recognized that the objects of the invention have been achieved by providing a phosphor composition which has an extremely fast rate of decay as well as the method of making such phosphor.

I claim as my invention:

1. A high-speed phosphor composition having a matrix of cadmium sulfide, cadmium-zinc sulfide, cadmium sulfo-selenide, or cadmium-zinc sulfo-selenide, wherein the gram-atom ratio of cadmium to zinc is at least 15:1 and the gram-atom ratio of sulfur to selenium is at least 3:1, said matrix being doped with at least one metal selected from the group consisting of aluminum, gallium and indium, in an amount of from 0.0001 to 0.05 gram atom per gram-atom of total cadmium plus zinc in said matrix said phosphor composition having a decay time of less than $5 \times 10^{-9}$ second and an electrical conductivity within the range of 5 mhos to $2 \times 10^3$ mhos, said electrical conductivity being substantially at that maximum possible value as is permitted by the amount of said dopant in said phosphor.

2. The phosphor of claim 1, wherein the total cadmium plus zinc in said matrix exceeds that amount required to form stoichiometric sulfide.

3. The phosphor as specified in claim 1, wherein substantially each atom of said dopant in said phosphor contributes one free electron to the electrical conductivity of said phosphor.

4. The phosphor as specified in claim 1, wherein said dopant is indium present in an amount of about 0.001 gram-atom per gram-atom of total cadmium plus zinc.

5. The method of preparing a high-speed phosphor having a matrix of cadmium or cadmium-zinc sulfide or sulfo-selenide and a dopant of at least one metal selected from the group consisting of aluminum, gallium and indium, which method comprises:

(a) prefiring cadmium sulfide, cadmium-zinc sulfide, cadmium sulfo-selenide, or cadmium-zinc sulfo-selenide in an inert or sulfurizing atmosphere at a temperature of from about 700° C. to 1200 °C. for a sufficient period of time to achieved a particle size as desired in said phosphor, the gram-atom ratio of cadmium to zinc in said sulfide or sulfo-selenide being at least 15:1, and the gram-atom ratio of sulfur to selenium being at least 3:1;

(b) adding to said sulfide or said sulfo-selenide the Group III-A metals aluminum, gallium and indium as sulfide or compound which will form sulfide on heating with the total Group III-A metal compound added to said sulfide or sulfo-selenide being such that the gram-atom ratio of total Group III-A metal to cadmium plus zinc is from 0.0001 to 0.05, said aluminum being added prior to said prefiring and said gallium and indium being added either before or after said prefiring; and (c) firing the resulting first-fired material either in a hydrogen atmosphere or in an atmosphere of cadium vapor at a temperature of from about 400° C. to about 600° C. for a sufficient period of time to cause the resulting fired material, after cooling, to display substantially a maximum possible value of electrical conductivity and a decay time of less than $5 \times 10^{-9}$ second.

6. The method as specified in claim 5, wherein the final firing is for a period of about 30 minutes.

7. The method as specified in claim 5, wherein said dopant is indium added in such amount as to constitute about 0.001 gram-atom of indium per gram-atom of total cadmium plus zinc.

References Cited

UNITED STATES PATENTS

| | | | |
|---|---|---|---|
| 2,529,711 | 11/1950 | Smith | 252—301.6 |
| 2,585,461 | 2/1952 | Hirsch | 252—301.6X |
| 2,887,632 | 5/1959 | Dalton | 252—301.6X |
| 3,089,856 | 5/1963 | Cyr et al. | 252—501X |

OTHER REFERENCES

Vlasenko et al.: "Optics and Spectroscopy," vol. XXI, No. 4, pp. 261–266, October 1966.

Marlor et al.: "British Journal of Applied Physics," vol. 16 pp. 797–803 (1965).

JAMES E. POER, Primary Examiner

J. COOPER, Assistant Examiner

U.S. Cl. X.R.

252—501, 518